United States Patent [19]

Ralston

[11] 4,010,783
[45] Mar. 8, 1977

[54] FLEXIBLE, COLLAPSIBLE CONTAINER FOR LIQUIDS HAVING REINFORCED TAIL PORTION

[75] Inventor: Philip G. Ralston, Woodstock, Ill.

[73] Assignee: Baxter Travenol Laboratories, Inc., Deerfield, Ill.

[22] Filed: July 21, 1975

[21] Appl. No.: 597,426

[52] U.S. Cl. .................. 150/1; 128/DIG. 24; 128/214 D; 206/583; 229/48 T; 229/55
[51] Int. Cl.² .................................. B65D 33/02
[58] Field of Search ............. 150/8, 1, 0.5; 128/DIG. 24, 272, 214 D, 227; 206/521; 229/48 T, 55, 53, 57, 58; 215/1 C, 100 A

[56] References Cited

UNITED STATES PATENTS

| | | | |
|---|---|---|---|
| 2,631,630 | 3/1953 | Brady et al. | 150/1 |
| 3,300,120 | 1/1967 | McColgan | 229/55 |
| 3,319,540 | 5/1967 | Stengle, Jr. | 229/58 X |
| 3,641,999 | 2/1972 | Greene | 128/DIG. 24 X |
| 3,651,186 | 3/1972 | Hall | 215/1 C X |
| 3,810,503 | 5/1974 | Lewis, Jr. | 150/8 |

Primary Examiner—Stephen P. Garbe
Attorney, Agent, or Firm—Paul C. Flattery; Garrettson Ellis

[57] ABSTRACT

A flexible-walled, tubular, collapsible container for liquids is disclosed of the type having a head portion with access means, and a tail portion with a sealed line joining sides of the container into a sealed end. In accordance with this invention, the sealed line occupies a recess defined in the sealed end by the flexible container walls. As a result of this, outwardly directed shock, created for example when the filled container is dropped, is absorbed by the walls of the recess, to protect the sealed line from rupture. Accordingly, the sealed end of the container of this invention exhibits increased strength and rupture resistance.

8 Claims, 3 Drawing Figures

FLEXIBLE, COLLAPSIBLE CONTAINER FOR LIQUIDS HAVING REINFORCED TAIL PORTION

BACKGROUND OF THE INVENTION

Flexible, collapsible containers or bags made of plastic have achieved very significant commercial acceptance in the field of parenteral solution and blood bags. Initially, these items have been made from heat-sealed vinyl plastic sheets, and have been quite satisfactory. However, it has been recognized that significant costs can be saved by the use of other manufacturing procedures such as blowmolding and the like. Also, there has been consideration of the use of less expensive materials other than vinyl plastic in containers, particularly those materials that do not contain a plasticizer. For example, polypropylene has been considered a suitable candidate for use as a container material, when extruded as a thin, flexible sheet.

However, it has proven difficult to manufacture thin-walled plastic bags from polypropylene which are capable of collapsing, yet which are strong enough to stand rough handling without breaking. For example, when many filled, conventional designs of blow-molded, polypropylene bags are dropped on the floor, they rupture along their tail seal line, which is the point at which the tubular plastic parison, from which the container is made by blow molding, is sealed together at its end.

One reason for this weakness is that, even if the flexible bag or container material is oriented by some process such as the well-known Orbet process of the Phillips Petroleum Company of Bartlesville, Oklahoma, the seal area at the end of the bag remains unoriented, and thus is not as strong as the rest of the bag.

Accordingly, there is a need for a stronger thin-walled, collapsible container or bag for use in dispensing blood, parenteral solutions, or any other desired material, which can be made by a blow-molding process or another automated, cost-saving method, and which can be made from plasticizer-free materials such as polyethylene, polypropylene, or other similar plastic materials.

In accordance with this invention, an improved seal structure for flexible-walled containers is disclosed, which may be used with either oriented or non-oriented plastic containers, resulting in a more reliable sealed end for such containers, especially for blow-molded containers made from tubular plastic parisons.

DESCRIPTION OF THE INVENTION

In this invention, a flexible-walled, tubular container is provided including a head portion with access means to the contents of the container, and a tail portion, defining a sealed line in the tail portion joining opposite sides of the container into a sealed end.

In accordance with this invention, the sealed line occupies a recess, defined in the sealed end by the flexible container walls. Accordingly, when outwardly directed shock strikes the sealed line joining opposite walls of the container, the full force of the shock is not focused upon the sealed line junction between the walls. This junction is, as stated previously, usually of unoriented plastic, and very likely has less strength than other portions of the bag wall. Instead, the entire, recessed portion of the bag walls receives the shock, and may be momentarily pushed outwardly by it, absorbing the shock and protecting the sealed line from rupture.

As a matter of fact, in many cases it is believed that the outward movement of the recessed portion of the bag walls under the influence of a force generated inside of the bag, can actually cause compression of the sealed line, rather than stress tending to cause rupture. As a result of this, the overall shock-resistance of the sealed tail end of the container is greatly increased, and can be comparable to the overall strength of the entire bag.

Referring to the drawings, FIG. 1 is an elevational view of a flexible container made in accordance with this invention, with a portion of its mold shown, and also showing an overcap closure which may be added after molding.

Figure 2:
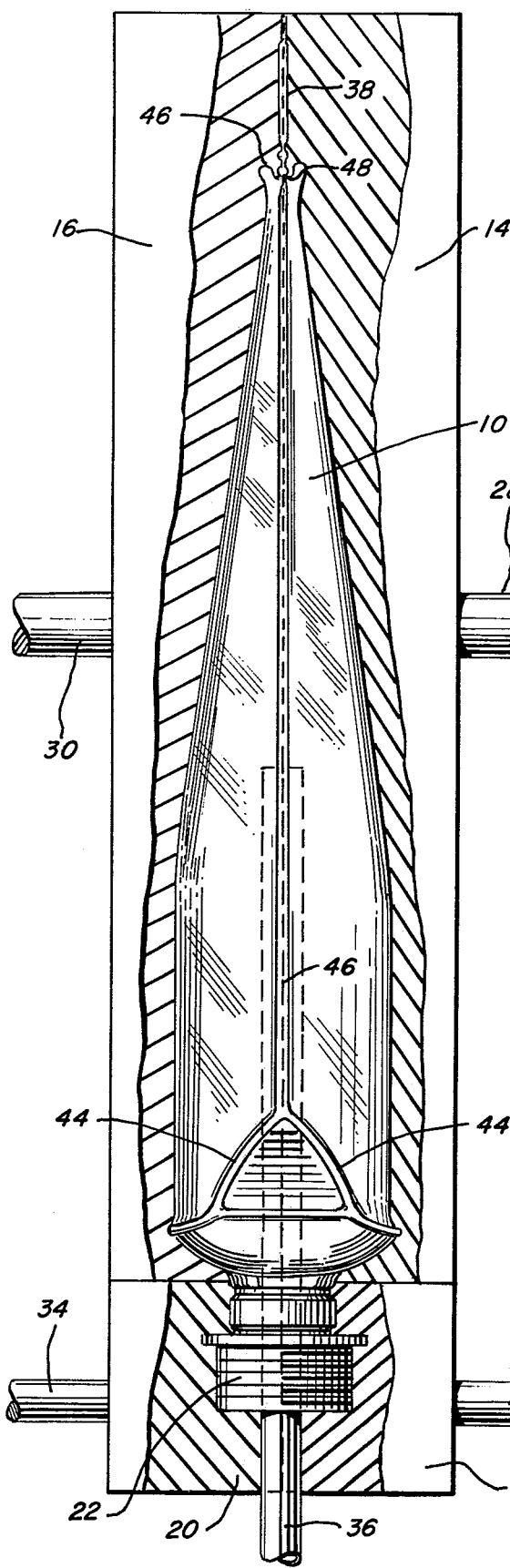
FIG. 2 is an elevational view of the same container, rotated 90°, and shown in conjunction with its mold, portions of the mold being broken away.

Referring to the drawings, flexible, collapsible container 10 is shown to be made from a heated tubular parison of molten polypropylene plastic or the like by a conventional blow-molding process, involving body mold halves 14, 16 for forming the body of container 10, and head mold halves 18, 20 for forming the head portion 22 of the container. As shown in FIG. 2, the head portion formed by mold halves 18, 20 is a relatively thick, rigid open tube having screw threads 24 on the outside thereof and defining a bore communicating with the interior of container 10.

Any conventional closure may be used to seal this structure. For example, a molded plastic closure member can be sealed in place across the mouth of head portion 22, having puncturable diaphragms for access into the container. An overcap 26, illustrated in FIG. 1, can also be applied after molding to the screw threads, for example an overcap similar to that disclosed in Weiler U.S. Pat. No. 3,730,372.

Blow-molding in general is a well-developed arm of technology, and many different techniques of blow-molding are currently available to those skilled in the art and which are usable for manufacturing the containers of this invention. In particular, the well-known Orbet process, mentioned above, is a highly suitable manufacturing process for the container of this invention, although other processes may also be used.

The tubular parison of hot, softened plastic is extruded in a conventional manner and placed into mold halves 14, 16, and head mold halves 18, 20. The mold halves 14, 16 are then brought together by pistons 28, 30. A blowing tube 36 is introduced into the mold at an appropriate time during the process, and air is introduced to expand the hot parison outwardly until it stretches to match the configuration of the interior of the closed mold halves. At an appropriate time, head mold halves 18, 20 are also closed, being operated by pistons 32, 34. The container 10 formed within the respective mold halves is allowed to cool. Thereafter, blow tube 36 may be withdrawn; the molds opened, and the container ejected.

Thereafter, an appropriate closure such as cap 26 can be placed upon head portion 22 of container 10.

Separate tubular parisons which have been pre-formed in a prior extruding operation can be reheated and processed in the mold as described above. Alternatively, the parison can be directly extruded and lowered before cooling into the molds.

Flat plastic hanger piece 38 is made from a section of the parison by molding as shown, to be formed integrally with container 10, and extending essentially the entire width of the container. An aperture 40 is generally provided in hanger piece 38, being generally formed after molding by cutting or the like, to facilitate hanging of the container in the position indicated in FIG. 1.

The container 10, in as-molded form, defines a shoulder portion 42 integral with head portion 22. The container also includes various gusset portions 44 defining certain lines of folding weakness, and longitudinal line of folding weakness 46, to facilitate the collapse of the bag in the manner illustrated in my previous U.S. application Ser. No. 526,092 filed Nov. 21, 1974. However, it is contemplated that the invention of this application can be utilized with any flexible plastic container.

In accordance with this invention, container 10 defines a tail end portion 46 which, in turn, defines a sealed line 48, joining opposite sides 50, 54 of tubular container 10 into a sealed end.

Figure 1:
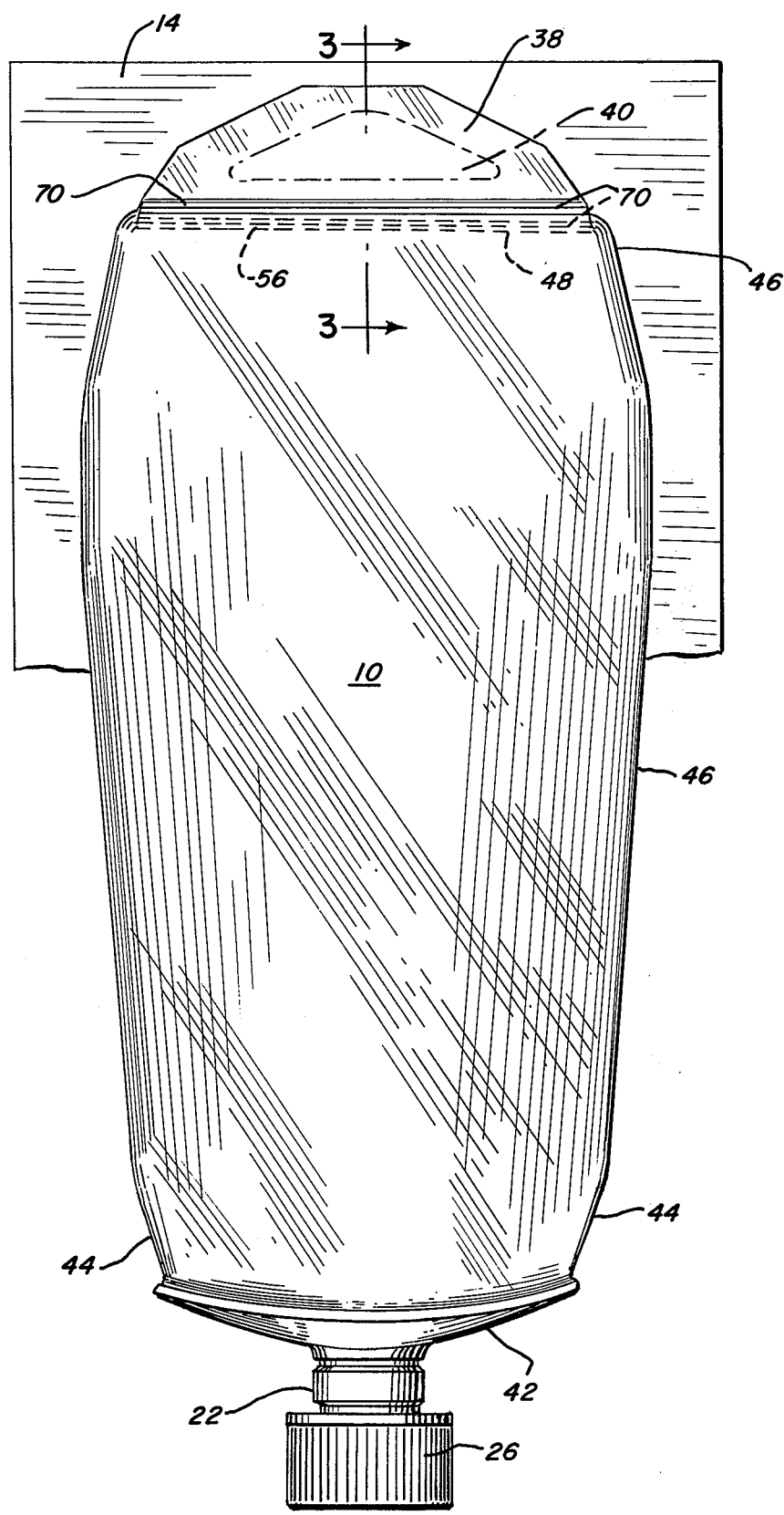

Sealed line 48 is formed by bringing the respective container walls 50, 54 together by mold halves 14, 16, and effecting a heat seal along line 48. As shown in FIG. 1, line 48 extends essentially the entire width of container 10.

Hanger piece 38 is formed by the mold out of the end of the parison into a flat piece, which is integral with sealed line 48 and extends away therefrom.

Figure 3:
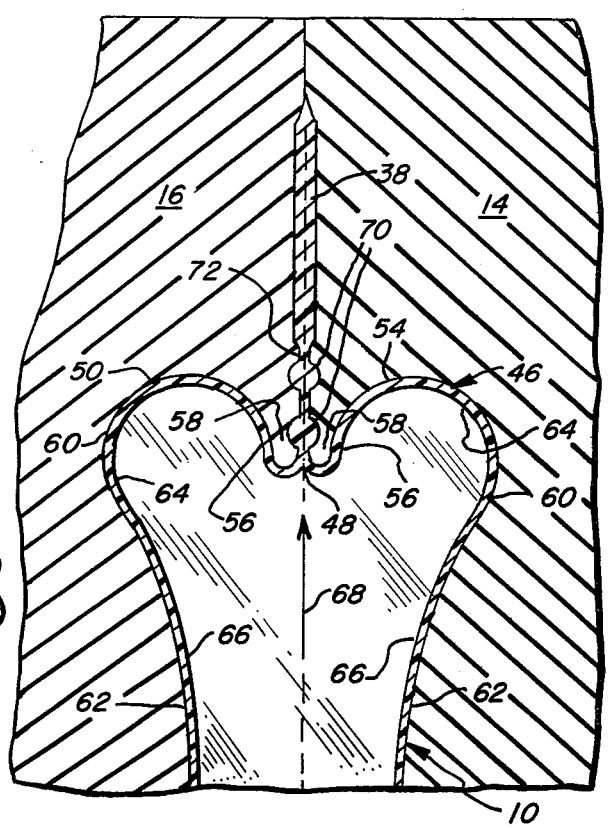
FIG. 3 is a highly-magnified, longitudinal sectional view, taken along line 3-3 of FIG. 1, showing in detail the structure of the sealed tail end portion of this invention.

The sealed end of tail portion 46 of container 10 is molded to define a recess 58, formed by the container walls, which is directed inwardly to the interior of container 10 to form a bellows-like structure at the end of container 10 as shown in FIG. 3. Recess 58 extends the entire length of seal line 48, and serves as a protection means for it, reducing the likelihood that rupture will take place in the vicinity of seal line 48 upon exposure to shock generated by dropping of the filled container or the like.

Recess 58 is formed by protruding portions of mold sections 14, 16, which result in the formation of recessed wall portions 56.

Mold halves 14, 16 also define relatively enlarged, semi-cylindrical chamber portions 60, relative to the mold chamber portions 62 immediately adjacent to portions 60, which also extend the length of seal line 48. The purpose of these relatively enlarged, semi-cylindrical chamber portions is to produce corresponding container wall portions 64, which are semi-cylindrical in cross-section, to provide the relatively transversely enlarged container portion 64, when compared with the immediately adjacent portions 66 of the container walls, as shown in FIG. 3.

The result of this structure is to provide a shock-resistant tail end portion 46. For example, if the filled container of this invention is dropped, impact with the floor wall result in a shock wave striking recessed portion 56 and seal line 48 in the approximate direction of arrow 68. In conventional tail seal structures of the prior art for flexible, blow-molded containers, the analogous structure to seal line 48 will be placed under considerable stress by the shock, and can rupture, since the area about seal line 48 tends to be weaker than other portions of the container. Typically, the line of rupturing which takes place is not directly on seal line 48, but is just adjacent to it.

In this present invention, the shock strikes the entire recessed portion 56, urging portion 56 outwardly. It can be seen from FIG. 3 that recessed portion 56 and semi-cylindrical portions 64 of the container wall can spring outwardly when subjected to outwardly directed shock symbolized by arrow 68, thus absorbing and diffusing shock without causing severe stress on seal line 48.

The recessed portion 56 will then tend to spring back into as-molded position after the shock has been absorbed.

As a result of this, containers made in accordance with this invention can stand considerably more rough handling without breaking, compared with conventionally manufactured containers of similar wall thickness and utilizing the same material for manufacture of the container. In particular, when high melting, stiffer plastic materials such as polypropylene are used, the difference between this present invention and conventional tail seal designs becomes quite prominent.

Flat plastic hanger 38 also defines one or more enlarged cylindrical portions 70, which serve as pressure relief members to provide the molten plastic of flat hanger piece 38 a place to flow as the sides of the molten parison are brought together into a firm heat seal. This also tends to improve the strength of the resulting seal of the sides of the opposite sides 50, 54 of the container, the seal generally extending from seal line 48 to its upper end 72. The remaining portions of flat piece 38 may generally constitute separate bag wall sections, or they may be held together in a weaker seal.

A typical container of this invention may be proportioned to contain a liter of parenteral solution, and may have an average wall thickness at the tail portion thereof from 0.01 to 0.02 inch. The distance of the tail seal from seal line 48 to upper portion 72 is typically from 0.15 to 0.2 inch, for example 0.187 inch, with the remaining structure of FIG. 3 being of proportionate size.

When filled with a liquid, the container of this invention can be expected to assume shapes other than that ideally shown in the drawings, in which the container shown is in as-molded condition. The exact shape of the filled container will vary from moment to moment with handling and its orientation to the vertical, since it is made of flexible material. However, the natural plastic "memory" of the container material can cause recessed portion 56 to be retained to a significant degree, to function in the manner described above.

The above has been offered for illustrative purposes only, and is not to be considered as limiting this invention, which is as described in the claims below.

That which is claimed is:

1. In a flexible-walled, flat-collapsible container including a sealed head portion with access means to the contents of the container, and a tail portion defining a sealed line joining sides of said container into a sealed end, the improvement comprising:

said sealed line occupying a recess defined in said sealed end by said flexible container walls, said sealed line and recess extending essentially the entire width of said container, whereby outwardly-directed shock is absorbed by movement of the walls of said recess to protect said sealed line from rupture, said sealed line being free of extra seal-reinforcing means.

2. The container of claim 1 which is made from a tubular, plastic parison by a blow-molding operation.

3. The container of claim 2 in which a flat plastic hanger piece is formed integral with said sealed line, and extends away therefrom.

4. In a flexible-walled, flat-collapsible container including a sealed head portion with access means to the contents of the container, and a tail portion defining a sealed line joining sides of said container into a sealed end, the improvement comprising:

said sealed line occupying a recess defined in said sealed end by said flexible container walls, said sealed line and recess extending essentially the entire width of said container, whereby outwardly-directed shock is absorbed by movement of the walls of said recess to protect said sealed line from rupture, and a flat hangar piece formed integral with said sealed line and extending away therefrom, being free of attachment to other portions of said container.

5. The container of claim 4 which is made from a tubular, plastic parison by a blow-molding operation.

6. The container of claim 4 in which said flexible container walls define, adjacent to said recess, relatively transversely enlarged semi-cylindrical wall sections, whereby said semi-cylindrical wall sections and said recess cooperate to provide springing resilience to said recess and sealed line, to deflect and diffuse shock directed outwardly against said sealed line.

7. In a flexible-walled, flat-collapsible container including a sealed head portion with means for access to the contents of the container, and a tail portion defining a sealed line joining sides of said container into a sealed end, the improvement comprising:

said sealed line occupying a recess defined in said sealed end by said flexible container walls, said sealed line and recess extending essentially the entire width of said container, said flexible container walls defining, adjacent said recess, relatively transversely enlarged semi-cylindrical wall sections, whereby said semi-cylindrical wall sections and said recess cooperate to provide springing resilience to said recess and sealed line, to deflect and diffuse shock directed outwardly against said sealed line, whereby outwardly-directed shock is absorbed by movement of the wall of said recess, to protect said sealed line from rupture, said sealed line being free of extra seal reinforcing means.

8. The container of claim 7 which is made from a tubular plastic parison by a blow-molding operation.

* * * * *